2,779,721

Patented Jan. 29, 1957

2,779,721

METHOD OF DRYING BUTYLENE OXIDES

Thomas Houtman, Jr., Theodore E. Zurawic, and John S. Spriggs, Midland, Mich., assignors to The Dow Chemical Company, Midland, Mich., a corporation of Delaware No Drawing. Application February 17, 1954,
Serial No. 411,030

2 Claims. (Cl. 202—42)

This invention relates to a method for removing water from butylene oxide. More particularly, this invention relates to drying 1,2-butylene oxide, cis- or trans-2,3-butylene oxide, isobutylene oxide, or mixtures thereof.

Butylene oxides have not attained the widespread industrial importance enjoyed by both ethylene and propylene oxide. Insofar as applicants are aware, there is no large scale use of a single butylene oxide in any reaction in which essentially anhydrous reactants are required, such as in polyoxyalkylations. This is due to the unavailability of dry butylene oxide which in turn is due to the lack of a commercial method for preparing the same. Like ethylene and propylene oxides, butylene oxides are usually prepared from the corresponding chlorohydrins by reaction with a hot dilute aqueous solution of sodium or calcium hydroxide. In such an operation, the temperature employed is sufficient to dehydrochlorinate any chlorohydrin present in the reaction mixture to the corresponding oxide and simultaneously to remove the resultant oxide by steam distillation immediately upon its formation. It so happens that butylene oxides, unlike ethylene or propylene oxide, form azetropes with water at atmospheric pressures. Therefore upon subjecting the butylene oxide-water condensate from the steam distillation step to fractional distillation, an azeotrope of butylene oxide and water is unavoidably formed. This azeotrope cannot readily be resolved by fractional distillation. As a result, dry butylene oxide cannot be prepared by the distillation method commonly used in making dry ethylene oxide and propylene oxide. Other methods heretofore proposed for drying wet butylene oxide have not been economically feasible.

It is therefore an object of this invention to provide a method by which water can be easily, effectively, and economically removed from a wet butylene oxide. A further object is to provide a continuous method for drying wet butylene oxides. Other objects and advantages will be apparent from the following description.

The method of the present invention is carried out by intimately contacting in the liquid phase, a wet butylene oxide, or mixture of wet butylene oxides, with a strong aqueous solution of an alkali metal hydroxide at a temperature below about 50° C. More particularly, the wet butylene oxide, which is ordinarily supplied as such from some other process in which it has been formed, is continuously washed with aqueous sodium hydroxide of greater than about 30 weight per cent strength to extract the water from the oxide phase. The butylene oxides which may be dried in accord with this method are those in which the oxygen atom is bonded to each of two contiguous carbon atoms, i. e. 1,2-butylene oxide, cis- and trans-2,3-butylene oxide, and isobutylene oxide. Tetramethylene oxide, i. e. tetrahydrofuran, is not a butylene oxide within the meaning of the present invention.

The wet butylene oxides treated in accord with the invention may contain as much water as will dissolve in the particular butylene oxide or mixture of butylene oxides at a pressure of approximately one atmosphere and a temperature up to 50° C. Azeotropic mixtures of water and one or more butylene oxides are not ordinarily subjected per se to the instant process. These azeotropes may contain up to about 7 weight percent water. Such a high concentration of water is not miscible in butylene oxide at a temperature below the boiling point of the azeotrope, viz. in the liquid phase. That is to say, butylene oxide-water azeotropes, when condensed and cooled, consist of a butylene oxide phase and an aqueous phase. The butylene oxide phase usually contains approximately 3 weight percent water at equilibrium conditions of about one atmosphere pressure absolute and 25° C. It is this wet butylene oxide phase which is dried in the present process.

Aqueous alkali metal hydroxide solutions of less than about 30 weight percent strength are unsuitable for drying wet butylene oxides according to the method of the present invention. Good drying of one or more wet butylene oxides can be achieved in the instant process, however, when aqueous alkali metal hydroxide solutions of from about 30 to about 50 weight percent strength are employed. Satisfactory results have been obtained when using a strong aqueous solution of either sodium or potassium hydroxide. It is likewise possible to employ effectively a strong aqueous solution of mixed alkali metal hydroxides. From a practical standpoint, however, aqueous sodium hydroxide solutions of greater than about 35 or 40 weight percent strength are preferred for best drying. When employing 37 percent by weight of aqueous sodium hydroxide under conditions of good extraction, at least 87 percent of the water can be removed from a mixture of butylene oxides containing approximately 80 percent 1,2-butylene oxide and about 2.3 percent water. Under the same conditions of extraction, an aqueous solution of sodium hydroxide of about 50 percent strength will remove 90 percent or more of the water from such a mixture of butylene oxides.

From the standpoint of economics, it is desirable in the process of the invention, to dry a wet butylene oxide with as little of the strong alkali metal hydroxide solution as possible. The optimum ratio of butylene oxide to aqueous hydroxide, and optimum contact time as well, are of course dependent on the strength of the hydroxide solution, the design of the reaction vessel, and other factors. Thus, when butylene oxide and strong aqueous caustic soda are intimately mixed for a time sufficiently long to obtain good extraction of water from butylene oxide, a relatively high ratio of butylene oxide to the caustic solution may be employed. For example, greater than 6 proportions by weight of butylene oxide containing almost 3 percent water have been effectively dried with only one proportion of aqueous sodium hydroxide of about 37 weight percent strength (c. f. Example 1). With respect to contact time, the more intimate the dispersion of liquids obtained by mixing, the shorter is the contact time required to effect the desired degree of extraction. In a countercurrent packed column employing strong aqueous caustic soda of greater than 30 weight percent strength, contact times of from about 1 to 5 seconds are ordinarily preferred for good drying and maximum throughput, although satisfactory drying may sometimes be obtained with somewhat shorter contact. A longer contact time than 10 seconds, e. g. 20 seconds or more, may be employed in such countercurrent extractions, but no further benefit is ordinarily obtained.

Although wet butylene oxide can be dried effectively in a batchwise manner, it is usually necessary to repeat the extractive mixing procedure several times. More desirably, wet liquid butylene oxide is dried in a continuous manner by continuously introducing both the strong aqueous alkali metal hydroxide and the liquid butylene oxide into a suitable extraction vessel in which the liquids are thoroughly mixed, and from which the liquids are continuously withdrawn after being mixed. Depending on the design of the extraction vessel, satisfactory separation of the liquids may sometimes be accomplished within the extraction vessel itself. Continuous countercurrent extraction in a column packed with filling bodies to increase the internal surfaces of the column is a highly effective way of operating and may be carried out so that the liquids will usually separate in zones continuous with the mixing zone. In such operation, the hydroxide drying solution continuously passes into the top of the column and out at the bottom while wet liquid butylene oxide is continuously fed into the bottom of the column and dry butylene oxide removed at the top. It is both possible and satisfactory to operate with either liquid butylene oxide or aqueous sodium hydroxide as the continuous phase, i. e. the latter may be dispersed in the former or vice versa. To cut down on caustic soda entrainment in the dry butylene oxide overhead, it has generally been desirable to disperse, e. g. by means of a sparger, aqueous sodium hydroxide in a packed column in which liquid butylene oxide is the continuous phase. Droplets of aqueous sodium hydroxide so dispersed form film-like layers on the surfaces of the filling bodies in passing downwardly therethrough. When operating in this manner under optimum conditions, water is continuously and almost completely removed from wet liquid butylene oxide.

Since the instant process is carried out in the liquid phase, the temperature is necessarily limited by the boiling point of the butylene oxide or mixed oxides at the pressure employed, e. g. the temperature is ordinarily maintained below about 50° C. and generally in the range of from about 0° to 40° C. To minimize the possibility of polymerizing the butylene oxide or forming glycols from it, temperatures in the range of about 10° C. to 30° C. are preferred. To maintain these temperatures, it is generally necessary to remove heat since heat is evolved when mixing a strong aqueous solution of an alkali metal hydroxide and wet butylene oxide. Alternatively, temperature control can be accomplished by cooling the liquids before they are brought into contact with each other. Atmospheric or slightly greater than atmospheric pressures are ordinarily preferred for best results.

Following extraction with strong aqueous alkali hydroxide solution, the substantially dry butylene oxide raffinate, e. g. containing less than about 0.5 weight percent water, may be distilled in a packed column under low reflux to remove any higher boiling impurities contained therein, e. g. glycol, polymer, etc. When maximum drying of the butylene oxide is desired, the water content may be further lowered, e. g. to about 0.2 weight percent or less, by carrying out a distillation of the raffinate in a still column having a large number of theoretical plates and employing a high reflux ratio. Removal of the last traces of water by fractionation is practicable when the concentration of water in butylene oxide is small, e. g. when butylene oxide contains less than about 0.5 weight percent water. For example, butylene oxide containing only 0.35 percent water can be dried in a practical manner by fractional distillation; the water is removed as an azeotrope (containing 7 percent water and 93 percent oxide) with the first few percent of the butylene oxide distilled, leaving the balance dry. On the other hand, it is impractical to dry butylene oxide containing even as little as 3.5 percent water, since at least half of the oxide distills as the azeotrope before the water is removed.

When the raffinate from the extraction step is a mixture of butylene oxides containing isobutylene oxide and one or more straight chain butylene oxides, e. g. cis-2,3-butylene oxide, trans-2,3-butylene oxide, or 1,2-butylene oxide, the iso isomer can be effectively separated therefrom by subjecting the said mixture to fractional distillation. For this separation, it is desirable to employ a still column having a large number of theoretical plates and carry out the distillative separation under a high reflux ratio. It is not only desirable but essential to remove isobutylene oxide from butylene oxides which are to be condensed to form long polyoxybutylene chains such as are present in polyoxybutylene glycols. This is because the iso compound, if present, would add to the polyoxybutylene chain and effectively cap it by forming an unreactive tertiary alcohol. Such a distillation would also dry the straight chain butylene oxides since isobutylene oxide and its water azeotrope distill at lower temperatures than straight chain butylene oxides.

The following examples illustrate the method of the invention:

EXAMPLE 1

This example illustrates the drying of wet mixed butylene oxides by continuously and countercurrently extracting water therefrom in a packed column with strong aqueous sodium hydroxide solutions.

The continuous countercurrent extractions were carried out in a glass column 4 feet in length by 2 inches inside diameter. A three foot bed of one-quarter inch Berl saddles (ceramic filling bodies) rested on a glass grid located about six inches above the bottom of the column.

Strong aqueous sodium hydroxide of 37.4 weight percent strength cooled to 10° C. was continuously sprayed into the upper part of the column by means of a sparger located just above the Berl saddles. This strong sodium hydroxide solution was passed downwardly through the packed column at a constant rate of 50 grams per minute. The spent caustic solution (extract) was continuously withdrawn from the bottom of the column. A mixture of wet liquid butylene oxides, also cooled to 10° C., was continuously introduced through another sparger located below the packing near the bottom of the column and the dry liquid butylene oxide mixture (raffinate) was continuously taken off at the top. The liquid butylene oxides fed to the column contained 2.54 percent by weight of water and had approximately the following composition on a water-free basis:

80% 1,2-butylene oxide
8% isobutylene oxide
3% cis-2,3-butylene oxide
8% trans-2,3-butylene oxide Five runs were carried out at different butylene oxide feed rates ranging from 100 to 318 grams of the mixed butylene oxides per minute. Flooding of the column occurred at this latter high rate. By precooling both the aqueous sodium hydroxide and the wet mixed butylene oxides to about 10° C., the temperatures of the liquids in the extraction column were maintained below about 20° C.

The following table gives data for the various runs. In the first column is listed the run number. Columns 2 and 3 give the rate in grams per minute and concentration in percent by weight of the strong aqueous sodium hydroxide fed to the column. The rate of feed and weight percent water content of the wet mixed butylene oxides are given in columns 4 and 5 respectively. Columns 6 and 7 list the water content of the raffinate and the sodium hydroxide content of the extract in percent by weight. The last column gives the percentage of water removed from the wet butylene oxides during the extraction. As will be seen from this column, water is effectively removed from wet butylene oxides according to the method of the invention.

A sixth run was carried out under slightly different conditions than the preceding runs by feeding 49.6 weight percent aqueous sodium hydroxide to the extraction column at a rate of 50 grams per minute. A mixture of wet butylene oxides of approximately the same composition tabulated above and containing 2.88 weight percent water was also fed to the column at a rate of 147 grams per minute. The temperature of these liquids was approximately 25° C. before entering the extraction column. The temperature inside the column rose to a maximum of about 35° C. with no cooling applied thereto. The data for this run (run 6) is also given in the following table. It will be noted from column 6 that the 49.6% aqueous caustic of run 6 was only slightly more effective in removing water from wet butylene oxide, than the 37.4% aqueous caustic of runs 1–5.

*Drying of wet butylene oxide*

| Rate | Sodium Hydroxide | | Butylene Oxide | | Raffinate, percent $H_2O$ | Extract, percent NaOH | Percent Water Removed |
|---|---|---|---|---|---|---|---|
| | Rate, gms./min. | Conc. | Rate, gms./min. | Percent $H_2O$ | | | |
| 1 | 50 | 37.4 | 100 | 2.54 | 0.33 | 36.0 | 87.0 |
| 2 | 50 | 37.4 | 147 | 2.54 | 0.33 | 36.0 | 87.0 |
| 3 | 50 | 37.4 | 198 | 2.54 | 0.33 | 35.5 | 87.0 |
| 4 | 50 | 37.4 | ¹318 | 2.54 | 0.33 | 35.5 | 87.0 |
| 5 | 50 | 37.4 | 251 | 2.54 | 0.34 | 35.0 | 86.7 |
| 6 | 50 | 49.6 | 147 | 2.88 | 0.27 | 45.3 | 90.6 |

¹ Flooding of the column occurred at this rate.

EXAMPLE 2

A mass balance was carried out on the continuous countercurrent extraction of water from a mixture of wet liquid butylene oxides with 37 weight percent aqueous sodium hydroxide. A butylene oxide loss of less than 2 percent was encountered upon drying 1368 pounds of wet mixed butylene oxides.

The extraction column used in the mass balance run was a glass tube 10 feet in length and four inches inside diameter. It was packed with 7 feet of one-half inch Raschig rings (ceramic filling bodies) resting on a glass grid 18 inches from the bottom of the column. The mixture of wet butylene oxides cooled to about 10° C. was sprayed into the lower part of the column just below the level of the Raschig rings. The composition of the butylene oxide mixture was approximately the same as in the preceding example but contained slightly more water, i. e. the water content was 3.03 percent. A solution of aqueous sodium hydroxide of about 37 weight percent strength and cooled to a temperature of 10° C. was sprayed into the top portion of the column just above the ceramic rings. The liquid-liquid interface was maintained approximately 15 inches from the bottom of the column. In such operation, the aqueous caustic passed, in the dispersed phase, down through the mixed butylene oxides and was removed at the base of the column. The dry butylene oxides were taken off at the top of the column. By cooling the liquid feeds to approximately 10° C. prior to entering the column, the maximum temperature of the liquid in the column was maintained throughout the run at about 20° C. The data for this run is tabulated below:

|  | Pounds |
|---|---|
| Butylene oxides into column (3.03% $H_2O$ content) | 1368 |
| Butylene oxides out of column (0.42% $H_2O$ content) | 1308 |
| Water removed from wet butylene oxides (86.7% removal) | 35.9 |
| Butylene oxides out of column (dry basis) | 1303 |
| Butylene oxide loss¹ (dry basis) | 24 |

¹ The total loss unaccounted for at the end of the run was calculated as butylene oxide. This corresponds to a butylene oxide loss of only 1.82 per cent.

EXAMPLE 3

The following example illustrates the further (distillative) drying of the butylene oxide raffinate after continuous countercurrent extraction with strong aqueous sodium hydroxide.

Into the lower portion of a packed still column having approximately 45 theoretical plates was continuously introduced a vapor phase mixture of butylene oxides previously dried according to the extraction procedure employed in the preceding examples. The approximate weight percent composition of the mixed butylene oxide feed to the distillation column was as follows: 90 percent straight chain butylene oxides, 9 percent isobutylene oxide, and 0.2 percent water. Employing a reflux ratio of 15:1, approximately 10 weight percent of the still feed was taken off overhead as distillate. This distillate was analyzed and found to contain in addition to isobutylene oxide, approximately 12 percent straight chain butylene oxides and 1.0 percent water. This represents a loss to the isobutylene oxide overhead of less than 2 percent of the straight chain oxides. The straight chain oxides taken off the bottom of the column as still residue contained no isobutylene oxide and less than 0.1 percent water.

That which is claimed is:

1. The method of preparing dry straight chain butylene oxide substantially free from isobutylene oxide which comprises subjecting to dispersion conditions to create an intimate two-phase dispersion, a strong aqueous solution of an alkali metal hydroxide of from about 30 to about 50 weight percent strength and a mixture of liquid butylene oxides containing less than 3.5 weight percent water and consisting of isobutylene oxide and at least one straight chain butylene oxide having an oxygen atom bonded to each of two contiguous carbon atoms, thereafter subjecting the liquid-phase dispersion to quiescent conditions to effect two-phase separation, recovering the butylene oxide phase so separated and subjecting it to fractional distillation to remove isobutylene oxide and water, said water being removed as an isobutylene oxide-water azeotrope, and recovering the straight chain butylene oxide residue substantially free from water and isobutylene oxide.

2. The method of preparing dry straight chain butylene oxide substantially free from isobutylene oxide which comprises forming an intimate liquid-phase mixture of a strong aqueous alkali metal hydroxide solution of from about 30 to about 50 weight percent strength and a mixture of butylene oxides containing no more water than will dissolve therein, said mixed butylene oxides consisting of isobutylene oxide and at least one straight chain butylene oxide from the group consisting of 1,2-butylene oxide and 2,3-butylene oxide, and thereafter separating the mixed butylene oxides from the aqueous alkali metal hydroxide solution, subjecting the mixed butylene oxides so separated to fractional distillation to remove isobutylene oxide and water therefrom, and recovering the straight chain butylene oxide residue substantially free from water and isobutylene oxide.

References Cited in the file of this patent

UNITED STATES PATENTS

| 2,251,895 | Reppe | Aug. 5, 1941 |
| 2,366,464 | Wilson | Jan. 2, 1945 |
| 2,550,847 | Mitchell et al. | May 1, 1951 |

OTHER REFERENCES

Leroux et al.: JACS 73:41–42 (1951).